United States Patent [19]
Faraj

[11] Patent Number: 5,836,295
[45] Date of Patent: Nov. 17, 1998

[54] OUTDOOR GRILL WITH REMOVABLE COMPONENTS

[76] Inventor: Abdul-Razzak Faraj, P.O. Box 566068, Atlanta, Ga. 31156

[21] Appl. No.: 950,339

[22] Filed: Oct. 14, 1997

[51] Int. Cl.[6] ............................................... A47J 37/00
[52] U.S. Cl. ............................ 126/25 R; 126/9 R; 99/390
[58] Field of Search ................................ 126/25 R, 25 A, 126/25 AA, 41 R, 41 A, 41 B, 9 R; 99/389–392, 340

[56] References Cited

U.S. PATENT DOCUMENTS

| | | | |
|---|---|---|---|
| 1,541,011 | 6/1925 | Vallos | 99/392 |
| 2,923,229 | 2/1960 | Halford | 126/25 R |
| 3,025,784 | 3/1962 | Williams | 99/390 |
| 3,276,351 | 10/1966 | Sundholm | 126/25 R |

FOREIGN PATENT DOCUMENTS 80828  5/1963  France ...................................... 99/390

*Primary Examiner*—James C. Yeung
*Attorney, Agent, or Firm*—John L. James

[57] ABSTRACT

A grill has detachable legs and removable fireboxes to conserve space during storage or transport. The fireboxes are spaced from the bottom of the housing to retard corrosion of the housing. The fireboxes may be mounted directly on the housing sidewalls or may be mounted on a liner that is mounted in the housing. A connecting nut is fastened to the bottom of the housing and supports a removable cooking rack assembly. The cooking rack folds down for transport or storage and folds up for use. The rack holds food vertically so that the food cooks from both sides simultaneously.

17 Claims, 2 Drawing Sheets

OUTDOOR GRILL WITH REMOVABLE COMPONENTS

FIELD OF THE INVENTION

The present invention relates generally to barbecue grills and, more particularly, to grills for outdoor use.

BACKGROUND OF THE INVENTION

Conventional outdoor grills have a cooking rack suspended over a firebox. When food is placed on the rack for cooking, one side of the food is cooked and the food turned to cook the other side. This process ensures thorough cooking but is not well suited for someone in a hurry. Some grills have adjustable racks wherein the distance between the fire and rack is variable to cook food at a faster or slower pace, but only one side of the food cooks at a time. Accordingly, it will be appreciated that it would be highly desirable to have a grill that cooks both sides of the food simultaneously and thereby reduce cooking time.

To reduce cooking time, some grills have a covering lid to trap heat similar to a household oven. Unfortunately, heat escapes slowing cooking time when the lid is opened or removed to observe cooking progress. It is desirable to have a grill in which cooking progress can be observed without removing the covering lid thereby retaining heat and reducing cooking time.

Most outdoor grills are made to be assembled once and left assembled for their lifetime without ever being disassembled. It is desirable to have a grill that can be partially disassembled to conserve space during transport or storage. It is also desirable to have an outdoor grill with removable grates so that they do not rattle during transport and can be easily loaded with charcoal.

SUMMARY OF THE INVENTION

Briefly summarized, according to one aspect of the present invention, an outdoor grill, comprises a housing having a central axis, a bottom, a first sidewall connected along a bottom edge of the first sidewall to the bottom on one side of the central axis and defining a first sidewall mounting site, and a second sidewall connected along a bottom edge of the second sidewall to the bottom on the other side of the central axis and defining a second sidewall mounting site; a first coupling member fastened to the bottom of the housing; a second coupling member having one end connected to the first coupling member and a distal end extending upward between the first and second sidewall mounting sites; a cooking rack having a bottom portion and a cooking area and being positioned between the first and second sidewall mounting sites; and mounting means for mounting the cooking rack on the distal end of the second coupling member.

The grill has detachable legs to conserve space when transporting or storing the grill. Food is cooked from both sides while held vertically in the cooking rack to speed cooking time. The rack folds down when not in use. The fireboxes are removably mounted making loading the fireboxes with fuel and igniting the fuel easier. Using a liner increases the life of the grill housing as does raising the fireboxes off the housing bottom.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
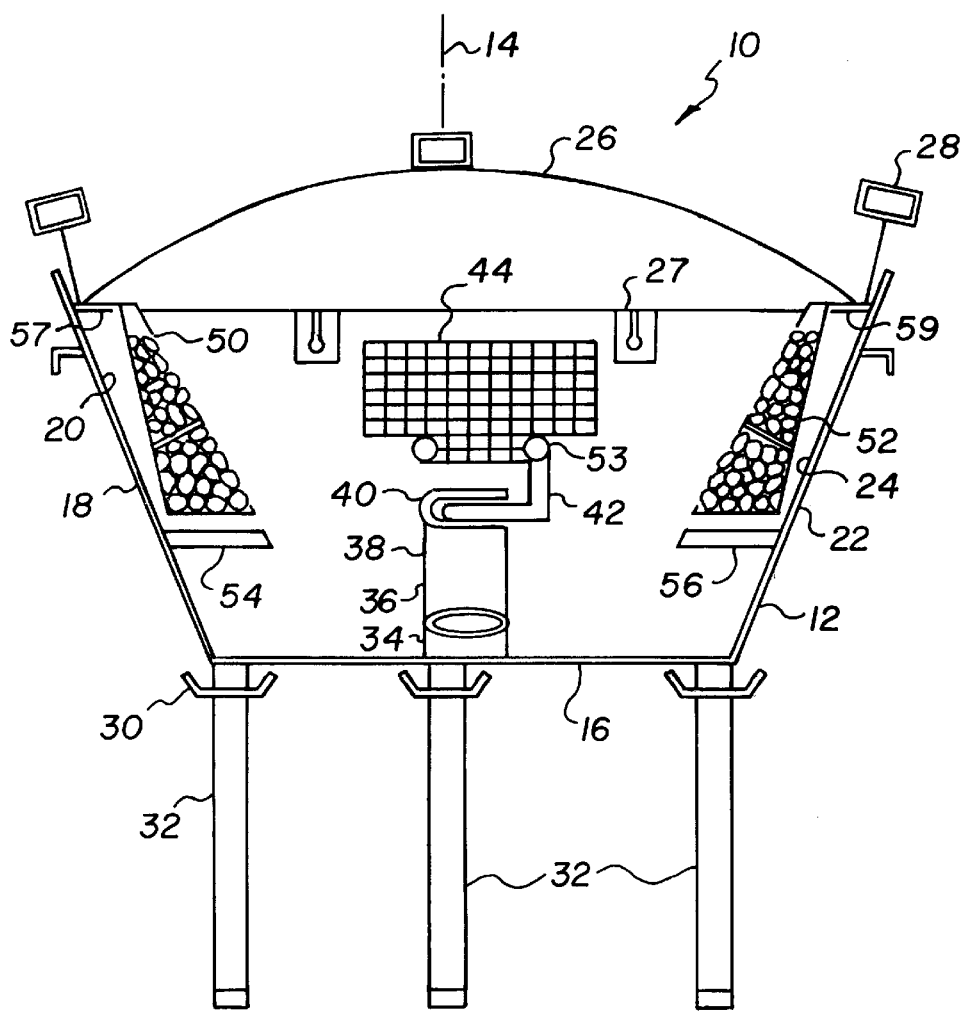
FIG. 1 is a diagrammatic sectional view of a preferred embodiment of an outdoor grill according to the present invention.
Figure 2:
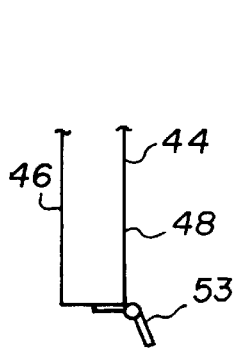
FIG. 2 is a diagrammatic end view of a cooking rack for the grill of FIG. 1.
Figure 3:
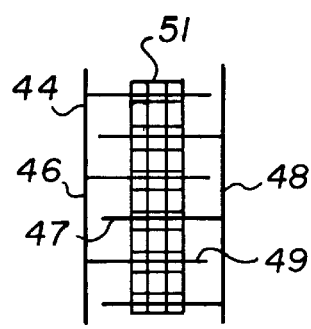
FIG. 3 is a top view of the cooking rack of FIG. 2.
Figure 4:
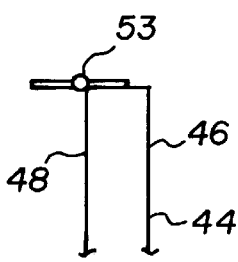
FIG. 4 is an end view similar to FIG. 2 but with the rack folded down.

Referring to FIG. 1, an outdoor grill 10 has a metal housing 12 that has a central axis 14 extending vertically as viewed in FIG. 1. The housing 12 has a bottom panel 16 and a first sidewall panel 18 connected along a bottom edge of the first sidewall panel 18 to the bottom panel 16 on one side of the central axis 14. The first sidewall panel 18 defines a first sidewall mounting site 20. A second sidewall panel 22 connects along a bottom edge of the second sidewall 22 to the bottom panel 16 on the other side of the central axis 14 and defines a second sidewall mounting site 24. The sidewalls 18, 22 may be perfectly vertical or may be angled to define a larger opening at their top edges than at their bottom edges as is known in the art.

The housing 12 is covered by a lid 26 preferably constructed of heat resistant glass or transparent plastic material so that the food cooking in the grill can be viewed while cooking. The sidewalls of the housing may also transparent viewing windows 27. Handles 28 are attached to the outside of the housing for lifting a carrying the grill. Attached to the outside surface of the bottom panel 16 are a plurality legs 30 that are relatively short so that the grill may be used on top of a table. The legs 30 may be oriented vertically or may be angled to increase the lateral stability of the grill. Each leg of the plurality of legs 30 has a leg extension 32 that preferably screws in place to increase the grill height when the grill is not used on top of a table. When the leg extensions 32 are removed, the grill has a relatively compact size making it easy to transport or store. The grill housing, legs and leg extensions are preferably constructed of rust resistant steel, but other metallic materials may be used as well as ceramic materials. Steel has an advantage over aluminum and other metals in that steel resists denting during transport and will thereby keep its appearance for a relatively long period of time, and readily paint and other finishes.

A first coupling member, such as threaded nut 34, is fastened to the bottom 16 of the housing 12 by welding or the like. Nut 34 is positioned along the central axis 14. A second coupling member 36 has a threaded end mateable with the threaded nut and has a distal end 38 that extends upward between the first and second sidewall mounting sites 20, 24. Distal end 38 preferably includes a socket 40 with a keyway. The socket 40 receives a connecting pin 42 that supports a cooking basket or rack 44.

Referring to FIGS. 1–4, the cooking rack 44 has a bottom portion and a cooking area and is positioned between the first and second sidewall mounting sites 20, 24. Cooking rack 44 has first and second rack members 46, 48 oriented parallel to one another and spaced from one another to receive meat or other food items therebetween vertically to be grilled from both sides simultaneously. Heating the food from both sides decreases cooking time significantly compared to conventional grills that cook only one side of the food at a time. Preferably, the rack members 46, 48 have protrusions 47, 49 along their bottom edges oriented so that protrusions 47 on left rack member 46 point toward right rack member 48, while protrusions 49 on right rack member 48 point toward left rack member 46, and both protrusions 47, 49 are intertwined with a bottom mesh 51 allowing the rack members 46, 48 to be opened to receive food and then closed while the food cooks. Distance between the rack members is adjusted by pushing the rack members together to decrease distance or pulling them apart to increase distance. A clasp or hook holds the top of the rack members together. To better hold meat, the rack members may be curved instead of flat, and may include prongs to engage the meat.

While a two-sided cooking rack with two rack members is preferred for its ability to hold all foods, a rack with a single rack member is easier to construct and use. Such a single sided rack can be used with or without the bottom mesh. Use with the mesh is achieved by having the rack curved to support the food. Tilting the single sided rack back at an angle also ensures that the meat stays on the rack without sliding, even if the rack is flat and not curved. To ensure uniform cooking with a curved or tilted rack, the rack is offset from the center axis so that both sides of the meat cook evenly, uniformly and at the same rate.

Cooking rack 44 is mounted on a hinge 53 that has one hinge half fastened to the bottom portion of the cooking rack 44 and the other hinge half is fastened to the connecting pin 42. The cooking rack is moveable between a cooking position at which the cooking rack is pivoted about the hinge 53 to extend above the hinge, and a storage position at which the cooking rack is pivoted about the hinge to extend below the hinge. By this construction, the cooking rack 44 may raised for cooking and lowered for transport or storage. When lowered for transport, the leg extensions 32 may be removed from the legs 30 and stored in the housing with the cooking rack. The hinge 53 is connected to the connecting pin 42 whereby sliding the connecting pin 42 into the socket 40 fixes the hinge 53 in position so that the cooking rack can move between its raised and lowered positions. When the spine on the connecting pin engages the keyway in the socket, the hinge is fixed in position and the cooking rack can pivot between the raised and lowered positions.

The food in the cooking rack is heated by means of fireboxes 50, 52. The fireboxes are equipped with horizontal shelves to hold charcoal vertically or at an angle to direct heat outward toward the cooking rack rather than directing heat upward in a conventional manner. The first firebox 50 is mounted along the first sidewall at the first sidewall mounting site and the second firebox 52 is mounted along the second sidewall at the second sidewall mounting site. The fireboxes are preferably removably mounted using first and second stop members 54, 56. The first stop member 54 is attached to the first sidewall 18 at the first sidewall mounting site and is spaced from the bottom panel 16 of the housing 12 to hold the first firebox 50 off the bottom panel 16. Similarly, the second stop member 56 is attached to the second sidewall 22 at the second sidewall mounting site and is spaced from the bottom panel 16 of the housing 12 to hold the second firebox off the bottom panel 16. Holding the fireboxes off the bottom panel 16 prolongs the life of the housing in two ways. First, the bottom panel does not get as hot as it otherwise would if the fireboxes were directly in contact with it so that deterioration due to heat alone is not as great. Second, unburned or partially burned coals and ashes are not left resting on the bottom panel to absorb moisture that would promote rusting or corroding of the bottom panel. The fireboxes preferably rest upon their respective stop members. Upper stop members 57, 59 may also be used to engage handles attached to the fireboxes. The handles facilitate insertion and removal of the fireboxes and resting them on upper stop members provides extra support, and, if a bottom stop member should fail, the top stop member is sufficient to hold the firebox off the bottom panel. The bottom stop members preferably screw into the housing but may be attached by welding or other means. Screwing the stop members into the housing allows them to be removed so that all grill components can be placed inside the housing for transport or storage.

Figure 5:
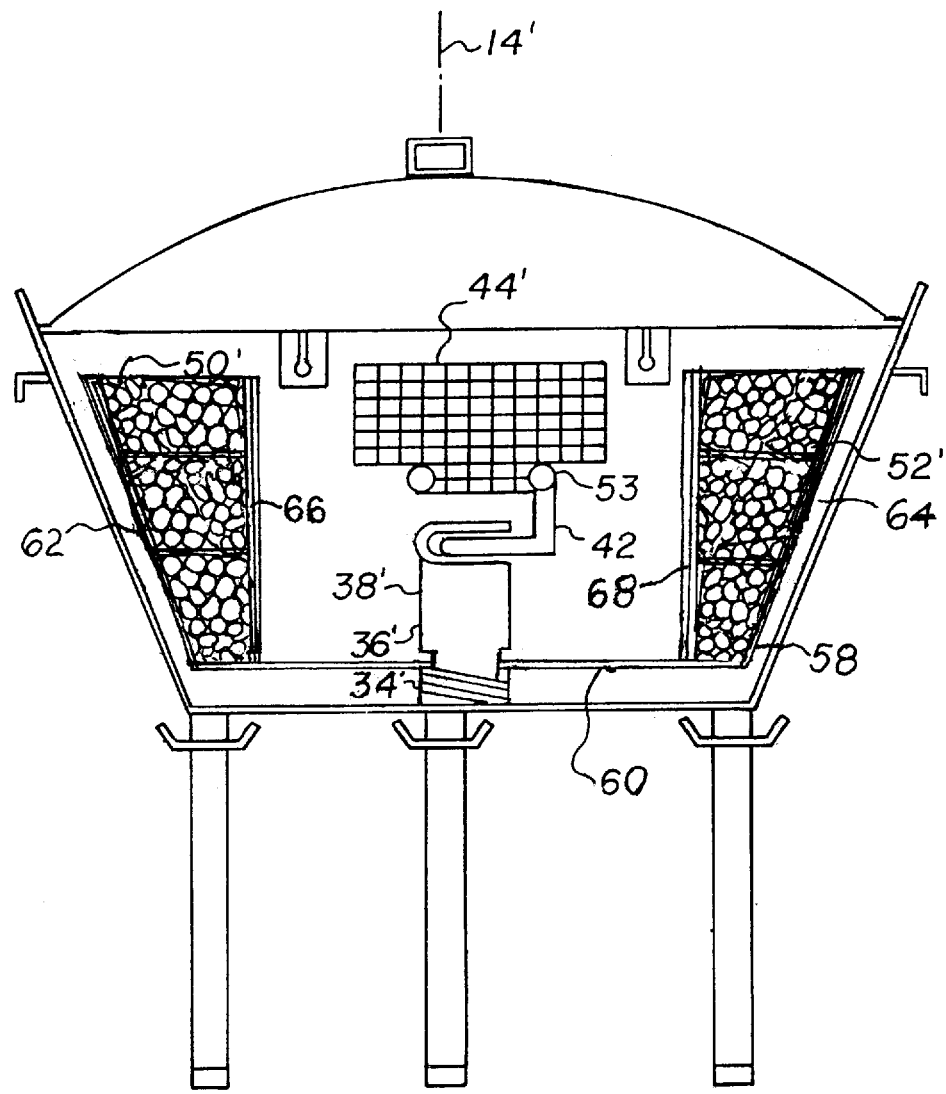
FIG. 5 is a sectional view similar to FIG. 1 but illustrating another preferred embodiment.

Referring now to FIG. 5, another preferred embodiment is illustrated wherein the fireboxes 50', 52' are attached to a liner 58 that is placed in the housing. The liner 58 has a central axis 14', a liner bottom 60 having an opening, a first liner sidewall 62 connected along a bottom edge of the first liner sidewall to the liner bottom on one side of the central axis. It defines a first liner sidewall mounting site. A second liner sidewall 64 is connected along a bottom edge of the second liner sidewall to the liner bottom on the other side of the central axis and defines a second liner sidewall mounting site. The liner 58 is mounted in the housing 12' with the distal end 38' of the second coupling member 36' extending through the bottom opening. The liner preferably rests on the connecting nut 34' so that the liner is spaced from the bottom of the housing.

The first firebox is mounted on the first liner sidewall at the first liner sidewall mounting site and is positioned along the first sidewall at the first sidewall mounting site. Similarly, the second firebox is mounted on the second liner sidewall at the second liner sidewall mounting site and is positioned along the second sidewall at the second sidewall mounting site. The fireboxes preferably have screens 66, 68 to hold the charcoal in position along a vertical plane facing the cooking rack.

Operation of the present invention is believed to be apparent from the foregoing description and drawings, but a few words will be added for emphasis. The grill is assembled by screwing the leg extensions into the legs when needed and screwing the second coupling member into the coupling nut. The stop members are screwed into the housing to receive the fireboxes which may be loaded with fuel and ignited before being placed in the housing or after being placed in the housing. The cooking rack is installed by inserting the connecting pin into the socket on the distal end of the connecting pin. Where a liner is used, it is installed first before the connecting pin.

While the invention has been described with particular reference to the preferred embodiments, it will be understood by those skilled in the art that various changes may be made and equivalents may be substituted for elements of the preferred embodiments without departing from invention. For example, while the connecting nut is preferably a threaded member, it may have a keyway instead or may be equipped with a set screw. As is evident from the foregoing description, certain aspects of the invention are not limited to the particular details of the examples illustrated, and it is therefore contemplated that other modifications and applications will occur to those skilled in the art. For example, the leg extensions may lock into position with push buttons instead of being screwed into the legs. It is accordingly intended that the claims shall cover all such modifications and applications as do not depart from the true spirit and scope of the invention.

What is claimed is:

1. An outdoor grill, comprising:

a housing having a central axis, a bottom, a first sidewall connected along a bottom edge of said first sidewall to said bottom on one side of said central axis and defining a first sidewall mounting site, and a second sidewall connected along a bottom edge of said second sidewall to said bottom on the other side of said central axis and defining a second sidewall mounting site;

a first coupling member fastened to said bottom of said housing;

a second coupling member having one end connected to said first coupling member and a distal end extending upward between said first and second sidewall mounting sites;

a first firebox mounted along said first sidewall at said first sidewall mounting site;

a second firebox mounted along said second sidewall at said second sidewall mounting site;

a cooking rack having a bottom portion and a cooking area and being positioned between said first and second sidewall mounting sites and;

mounting means for mounting said cooking rack on said distal end of said second coupling member, said mounting means including a hinge attached to said bottom portion of said cooking rack, said cooking rack being movable between a cooking position at which said cooking rack is pivoted about said hinge to extend substantially about said hinge and a storage position at which said cooking rack is pivoted about said hinge to extend substantially below said hinge.

2. An outdoor grill, as set forth in claim 1, including a connecting pin fastened to said hinge.

3. An outdoor grill, as set forth in claim 2, including a socket on said distal end of said coupling member for receiving said connecting pin.

4. An outdoor grill, as set forth in claim 3, including a spline on said pin and a keyway in said socket, said spline engaging said keyway to lock said pin at a desired position.

5. An outdoor grill, as set forth in claim 1, wherein said cooking rack has first and second rack members oriented parallel to one another and spaced from one another to receive food therebetween vertically to be grilled from both sides of the food simultaneously.

6. An outdoor grill, as set forth in claim 1, wherein said first and second fireboxes are removably mounted.

7. An outdoor grill, as set forth in claim 1, including a plurality of legs attached to said bottom of said housing.

8. An outdoor grill, as set forth in claim 7, including a plurality of leg extenders removably attached to said plurality of legs.

9. An outdoor grill, as set forth in claim 1, wherein said housing sidewalls define a viewing window.

10. An outdoor grill, comprising:

a housing having a central axis, a bottom, a first sidewall connected along a bottom edge of said first sidewall to said bottom on one side of said central axis and defining a first sidewall mounting site, and a second sidewall connected along a bottom edge of said second sidewall to said bottom on the other side of said central axis and defining a second sidewall mounting site;

a first coupling member fastened to said bottom of said housing;

a second coupling member having one end connected to said first coupling member and a distal end extending upward between said first and second sidewall mounting sites;

a cooking rack having a bottom portion and a cooking area and being positioned between said first and second sidewall mounting sites and;

mounting means for mounting said cooking rack on said distal end of said second coupling member;

a liner having a central axis, a liner bottom having an opening, a first liner sidewall connected along a bottom edge of said first liner sidewall to said liner bottom on one side of said central axis and defining a first liner sidewall mounting site, and a second liner sidewall connected along a bottom edge of said second liner sidewall to said liner bottom on the other side of said central axis and defining a second liner sidewall mounting site, said liner being mounted in said housing with said distal end of said second coupling member extending through said bottom opening;

a first firebox mounted on said first liner sidewall at said first liner sidewall mounting site and positioned along said first sidewall at said first sidewall mounting site; and a second firebox mounted on said second liner sidewall at said second liner sidewall mounting site and positioned along said second sidewall at said second sidewall mounting site.

11. An outdoor grill, as set forth in claim 10, including means for spacing said liner from said bottom of said housing.

12. An outdoor grill, as set forth in claim 10, wherein said liner rests on said first coupling member so that said liner is spaced from said bottom of said housing.

13. An outdoor grill, comprising:

a housing having a central axis, a bottom, a first sidewall connected along a bottom edge of said first sidewall to said bottom on one side of said central axis and defining a first sidewall mounting site, and a second sidewall connected along a bottom edge of said second sidewall to said bottom on the other side of said central axis and defining a second sidewall mounting site;

a first coupling member fastened to said bottom of said housing;

a second coupling member having one end connected to said first coupling member and a distal end extending upward between said first and second sidewall mounting sites;

a cooking rack having a bottom portion and a cooking area and being positioned between said first and second sidewall mounting sites;

mounting means for mounting said cooking rack on said distal end of said second coupling member;

a first firebox removably mounted along said first sidewall at said first sidewall mounting site;

a second firebox removably mounted along said second sidewall at said second sidewall mounting site;

a first stop member attached to said first sidewall at said first sidewall mounting site and spaced from said bottom of said housing to hold said first firebox off said bottom; and a second stop member attached to said second sidewall at said second sidewall mounting site and spaced from said bottom of said housing to hold said second firebox off said bottom.

14. An outdoor grill, comprising:

a housing having a central axis, a bottom, a first sidewall connected along a bottom edge of said first sidewall to said bottom on one side of said central axis and defining a first sidewall mounting site, and a second sidewall connected along a bottom edge of said second sidewall to said bottom on the other side of said central axis and defining a second sidewall mounting site;

a first firebox located at said first sidewall mounting site;

a second firebox located at said second sidewall mounting site;

a first coupling member fastened to said bottom of said housing;

a second coupling member having one end connected to said first coupling member and a distal end extending upward between said first and second fireboxes;

a cooking rack having a cooking area and being positioned between said first and second fireboxes and;

mounting means for adjustably mounting said cooking rack on said distal end of said second coupling member, said mounting means including a hinge attached to said bottom portion of said cooking rack, said cooking rack being movable between a cooking position at which said cooking rack is pivoted about said hinge to extend substantially above said hinge and a storage position at which said cooking rack is pivoted about said hinge to extend substantially below said hinge.

15. An outdoor grill, as set forth in claim 14, including:

a connecting pin fastened to said hinge; and a socket on said distal end of said coupling member for receiving said connecting pin.

16. An outdoor grill, as set forth in claim 15, including a spline on said pin and a keyway in said socket, said spline engaging said keyway to lock said pin at a desired position.

17. An outdoor grill, as set forth in claim 14, wherein said cooking rack has first and second rack members oriented parallel to one another and spaced from one another to receive food therebetween vertically to be grilled from both sides of the food simultaneously.

* * * * *